United States Patent
Dodson

(10) Patent No.: US 11,017,330 B2
(45) Date of Patent: May 25, 2021

(54) METHOD AND SYSTEM FOR ANALYSING DATA

(71) Applicant: Elasticsearch B.V., Mountain View, CA (US)

(72) Inventor: Stephen Dodson, London (GB)

(73) Assignee: Elasticsearch B.V., Amsterdam (NL)

( * ) Notice: Subject to any disclaimer, the term of this patent is extended or adjusted under 35 U.S.C. 154(b) by 209 days.

(21) Appl. No.: 14/717,028

(22) Filed: May 20, 2015

(65) Prior Publication Data

US 2015/0339600 A1    Nov. 26, 2015

Related U.S. Application Data

(60) Provisional application No. 62/000,609, filed on May 20, 2014.

(51) Int. Cl.
| | |
|---|---|
| *G06F 17/10* | (2006.01) |
| *G06Q 10/04* | (2012.01) |
| *G06F 17/18* | (2006.01) |
| *G06Q 10/00* | (2012.01) |

(52) U.S. Cl.
CPC ............. *G06Q 10/04* (2013.01); *G06F 17/18* (2013.01); *G06Q 10/00* (2013.01)

(58) Field of Classification Search
None
See application file for complete search history.

(56) References Cited

U.S. PATENT DOCUMENTS

| | | | |
|---|---|---|---|
| 5,511,164 A | 4/1996 | Brunmeier et al. | |
| 5,905,892 A | 5/1999 | Nielsen et al. | |
| 6,012,152 A | 1/2000 | Douik et al. | |
| 6,820,251 B1 | 11/2004 | Dwyer | |
| 7,200,773 B2 | 4/2007 | Luick | |
| 7,280,988 B2* | 10/2007 | Helsper | G06F 11/3006 |
| | | | 702/182 |
| 7,309,833 B2 | 12/2007 | Robeson et al. | |
| 7,310,590 B1* | 12/2007 | Bansal | G06F 11/0715 |
| | | | 702/181 |

(Continued)

FOREIGN PATENT DOCUMENTS

| | | |
|---|---|---|
| AU | 5142098 A | 6/1998 |
| BR | 9713153 A | 2/2000 |

(Continued)

OTHER PUBLICATIONS

Marina Meila Comparing Clusterings—An Information Based Distance Journal of Multivariate Analysis 98, 2007 pp. 873-895 (Year: 2006).*

(Continued)

*Primary Examiner* — Rehana Perveen
*Assistant Examiner* — Cuong V Luu
(74) *Attorney, Agent, or Firm* — Carr & Ferrell LLP

(57) ABSTRACT

A method and system for analysing data is disclosed. One or more data records are passed to a data analysis system. The data records comprised a plurality of data items and a first one of the data items is selected from the data items in the data record. A statistical model can be retrieved from a store in a computer system and the statistical model used to detect abnormal results from the selected data item and produce a data model. This statistical model is stored with the data record in the data base.

19 Claims, 3 Drawing Sheets

(56) References Cited

U.S. PATENT DOCUMENTS

| | | | | |
|---|---|---|---|---|
| 7,451,210 B2* | 11/2008 | Gupta | ............... | G06F 11/008 709/223 |
| 7,539,593 B2* | 5/2009 | Machacek | ......... | G05B 23/0221 702/127 |
| 7,881,535 B1* | 2/2011 | McLaughlin | ......... | G06Q 40/02 382/186 |
| 8,015,279 B2 | 9/2011 | Christodoulou et al. | | |
| 8,027,439 B2* | 9/2011 | Zoldi | ................ | G06Q 40/02 379/114.14 |
| 8,324,260 B1* | 12/2012 | Garcia da Rocha | ....................... | A61K 31/4174 514/396 |
| 8,543,689 B2 | 9/2013 | Dodson | | |
| 9,038,172 B2 | 5/2015 | Miller et al. | | |
| 9,224,067 B1 | 12/2015 | Lu et al. | | |
| 9,314,449 B2* | 4/2016 | Garcia da Rocha | .... | A61P 25/20 |
| 9,407,651 B2* | 8/2016 | Mathis | ............... | H04L 41/145 |
| 9,516,053 B1 | 12/2016 | Sudhakar et al. | | |
| 2001/0000192 A1* | 4/2001 | Gonzalez | ............... | G06F 16/00 |
| 2003/0065409 A1* | 4/2003 | Raeth | ..................... | G05B 9/02 700/31 |
| 2003/0101076 A1* | 5/2003 | Zaleski | ............... | G06Q 50/22 705/2 |
| 2005/0080806 A1* | 4/2005 | Doganata | ............ | G06F 11/0709 |
| 2006/0020924 A1* | 1/2006 | Lo | ....................... | G06F 11/0709 717/127 |
| 2006/0167917 A1 | 7/2006 | Solomon | | |
| 2006/0190583 A1 | 8/2006 | Whalen | | |
| 2007/0277152 A1 | 11/2007 | Srinivasan | | |
| 2008/0021994 A1* | 1/2008 | Grelewicz | ........... | G06F 11/3428 709/224 |
| 2008/0071638 A1* | 3/2008 | Wanker | ............... | G06Q 30/02 705/7.32 |
| 2008/0114725 A1 | 5/2008 | Indeck et al. | | |
| 2009/0049335 A1 | 2/2009 | Khatri et al. | | |
| 2009/0106178 A1* | 4/2009 | Chu | ..................... | G06N 20/00 706/14 |
| 2009/0177692 A1* | 7/2009 | Chagoly | ............. | G06F 11/0709 |
| 2009/0254312 A1* | 10/2009 | Kube | ................. | G05B 23/0256 702/186 |
| 2011/0078106 A1* | 3/2011 | Luchi | ................. | G06F 11/3452 706/48 |
| 2011/0145400 A1* | 6/2011 | Dodson | ............... | G06F 11/0709 709/224 |
| 2012/0137367 A1 | 5/2012 | Dupont et al. | | |
| 2012/0296974 A1 | 11/2012 | Tabe | | |
| 2013/0031130 A1* | 1/2013 | Hahm | ..................... | G06F 16/26 707/769 |
| 2013/0198206 A1* | 8/2013 | Jones | ..................... | G06F 16/215 707/749 |
| 2013/0238476 A1 | 9/2013 | Green | | |
| 2013/0262347 A1* | 10/2013 | Dodson | ................ | G06F 11/328 706/11 |
| 2013/0326620 A1 | 12/2013 | Merza et al. | | |
| 2014/0006330 A1* | 1/2014 | Biem | ..................... | G06F 21/577 706/46 |
| 2014/0108640 A1* | 4/2014 | Mathis | ................. | H04L 41/145 709/224 |
| 2015/0058982 A1 | 2/2015 | Eskin et al. | | |
| 2015/0082437 A1* | 3/2015 | Dodson | ................ | G06F 21/552 726/23 |
| 2015/0180894 A1 | 6/2015 | Sadovsky et al. | | |
| 2015/0235312 A1* | 8/2015 | Dodson | ................ | G06Q 40/04 705/37 |
| 2015/0302310 A1* | 10/2015 | Wernevi | ................ | G16H 50/20 706/12 |
| 2016/0055654 A1 | 2/2016 | Flanders et al. | | |
| 2016/0226901 A1 | 8/2016 | Baikalov et al. | | |
| 2017/0063910 A1 | 3/2017 | Muddu et al. | | |
| 2017/0148096 A1* | 5/2017 | Dodson | ................ | G06Q 40/04 |
| 2018/0314835 A1 | 11/2018 | Dodson et al. | | |
| 2018/0316707 A1 | 11/2018 | Dodson et al. | | |

FOREIGN PATENT DOCUMENTS

| | | |
|---|---|---|
| CA | 2272609 A1 | 6/1998 |
| EP | 2360590 A2 | 8/2011 |
| EP | 3616096 A1 | 3/2020 |
| WO | WO1998024222 A2 | 6/1998 |
| WO | WO2012154657 A2 | 11/2012 |
| WO | WO2018200112 A1 | 11/2018 |
| WO | WO2018200113 A1 | 11/2018 |

OTHER PUBLICATIONS

Spiliopoulou et al. MONIC—Modeling and Monitoring Cluster Transitions KDD'06, Aug. 2006, ACM (Year: 2006).*

Extended European Search Report dated Sep. 22, 2011 in Application No. EP10194379.3, 6 pages.

European Office Action dated Sep. 20, 2013 in Application No. 10194379.3, filed Aug. 24, 2011, 2 pages.

Summons to Attend Oral Proceedings dated Oct. 7, 2015 in Application No. 10194379.3, filed Aug. 24, 2011. 9 pages.

"International Search Report" and "Written Opinion of the International Searching Authority," Patent Cooperation Treaty Application No. PCT/US2018/024660, dated Jun. 26, 2018, 9 pages.

Domingues, Remi, "Machine Learning for Unsupervised Fraud Detection," Royal Institute of Technology, School of computer Science and Communication, KTH CSC, SE-100 44 Stockholm, Sweden, 2015 [retrieved on May 21, 2018], Retrieved from the Internet: <URL:http://www.diva-portatorg/smash/get/diva2:897808/FULLTEXT01.pdf>, 66 pages.

"International Search Report" and "Written Opinion of the International Searching Authority," Patent Cooperation Treaty Application No. PCT/US2018/024671, dated Jul. 27, 2018, 15 pages.

Chandola, Varun et al., "Anomaly Detection: A Survey," ACM Computing Surveys, Aug. 15, 2007, pp. 1-72, Retrieved from the Internet: <URL:http://www.cs.umn.edu/sites/cs.umn.edu/tiles/tech_reports/07-017.pdf>.

Soule et al., "Combining Filtering and Statistical Methods for Anomaly Detection", USENIX, The Advanced Computing Systems Association, 24 Oct. 2005, pp. 1-14.

"Extended European Search Report", European Patent Application 18791513.7, dated Sep. 14, 2020, 9 pages.

Domingues et al., "Machine Learning for Unsupervised Fraud Detection", Stockholm, Sweden 2015, Kth Royal Institute of Technology School of Computer Science and Communication, Second Cycle (Year: 2015), 66 pages.

Riveiro et al., "Improving maritime anomaly detection and situation awareness through interactive visualization", IEEE Xplore, Sep. 26, 2008, 8 pages.

* cited by examiner

METHOD AND SYSTEM FOR ANALYSING DATA

CROSS-REFERENCE TO RELATED APPLICATIONS

The present application claims the benefit of the filing date of U.S. Provisional Patent Application Ser. No. 62/000,609 filed by the present inventors on May 20, 2014 and entitled "Method and system for analysing data."

The aforementioned provisional patent application is hereby incorporated by reference in its entirety.

BACKGROUND OF THE INVENTION

Field of the Invention

The field of the invention relates to a system and method for analysing data.

Brief Description of the Related Art

Many companies in a large variety of industries store large volumes of data, which are increasing in volume over time. These large volumes of data may include, but are not limited to, financial transaction data, computer network, infrastructure data, environmental data, operational data and social statistics. The data can be analysed or mined to identify trends, anomalies, and/or patterns in the data. The identified trends, anomalies or patterns can be used to understand and address particular problems. Current methods of data analysis are good at retrieving specific content about the data. For example, they are very efficient at retrieving all transactions for a specific user or host.

Known data analysis systems, such as Splunk, are able to store, index and utilize the large volumes of data. Other systems are known that create complex data models from the data, for example a system supplied by Prelert, Inc. Framingham, Mass. These data models enable users to glean insights such as anomalies or trends into historical and newly ingested data.

The known systems generate the information by a complete re-analysis of the incoming data. This re-analysis of the data can take a large amount of time. For example, it is common to analyse the data overnight in a batch process, when a processor is not heavily used. This (re)-analysis of the data is suitable for the identification of trends in the data, for which no immediate action has to be made. On the other hand, if the results are required in real-time, for example because of a change in a trend or a series of anomalous results, then these prior art methods do not enable the provision of the information sufficiently quickly.

One example of a prior art method for the analysis of data is disclosed in the U.S. Pat. No. 8,832,120 issued Sep. 9, 2014. This patent document teaches a computer-based method of determining a so-called weirdness score for variables within a large data set.

SUMMARY OF THE INVENTION

A method for analysing data is disclosed. One or more data records are passed to a data analysis system. The data records comprised a plurality of data items. In the case of anomaly detection, the value of one or more of the data items in one or more of the data records is compared with an expected value derived from a statistical model. The statistical model is derived from previous data records. On identifying an abnormal value, i.e. a value that falls substantially outside of the range of expected values, then the data model can be updated to indicate an anomaly. The statistical model is updated using the passed data records using the earlier statistical model. The statistical models are persisted for use as more data items are analysed, and the data models are persisted as a database of insights into the original data records.

The method of this disclosure enables statistical models to be quickly and efficiently updated by using the previously calculated statistical model and updating the statistical models with the new data records. The resulting data model (containing insights such as anomalies) can be stored with the associated data records in the data base, which allows the data records to be readily accessed if required. For example, the user or supervisor might receive the message about the anomaly and wish to review the associated data records.

In the case of anomaly detection, the expected values could be described by a normal distribution parameterised by the mean and variance of some of the values of data items, an indication of the class of membership of one or more of the data items or membership of a cluster, or a periodic trend. These examples are not limiting of the invention. In one aspect of the invention, the data model is indexed to allow rapid retrieval.

The disclosure also teaches a system for analysing of the data that comprises at least one data entry device for the ingestion of at least one data record. A data analysis system accepts at least one of the plurality of data items from the data records and compares the value of the accepted one of the plurality of data items with an expected value. The data analysis system also updates a statistical model using the accepted one of the plurality of data items. An entry can be written to the data model if the value is abnormal or extraneous, i.e. lies outside a range of expected values. This entry can be reviewed by a user or administrator and the incident investigated. This forensic investigation can also use entries from the data model. The updated statistical model is stored in a statistical model.

Still other aspects, features, and advantages of the present invention are readily apparent from the following detailed description simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE FIGURES

For a more complete understanding of the present invention and the advantages thereof, reference is now made to the following description and the accompanying drawings, in which.

DETAILED DESCRIPTION OF THE INVENTION

The invention will now be described on the basis of the drawings. It will be understood that the embodiments and aspects of the invention described herein are merely examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
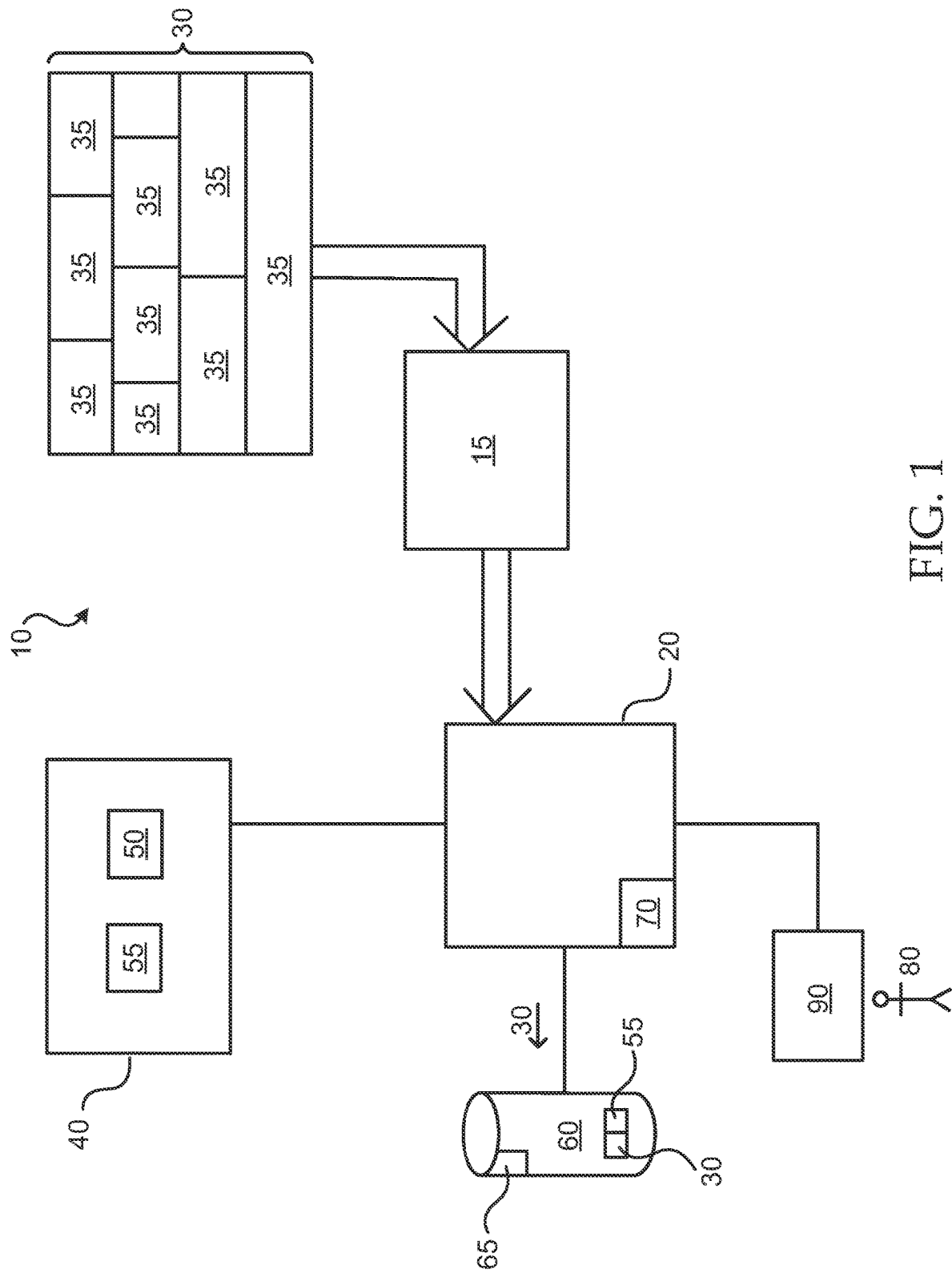
FIG. 1 shows an example of the system of the analysis of the data.

FIG. 1 shows an example of the system 10 for the analysis of data, according to one aspect of this invention. The system comprises a data analysis system 20, which is connected to a store 40 and a data base 60. The data base 60 stores data records 30 and is managed by a data base management system 65. The store 40 stores a statistical model 50, which is created from the data records 30, and one or more data model 55. The construction of the statistical model 50 and the data model 55 will be discussed later. The data base 60 is adapted to store in a non-transient manner a plurality of data records 30, which are input into the data analysis system 20. A terminal 90 with a viewer is connected to the system and receives messages from the data analysis system 20 for review by a user or administrator. The user or administrator can use the terminal 90 to investigate the messages and then review the data records 30 in the data base 60.

The input of the data records 30 is made by means of a data entry device 15. The data entry device 15 collects the data records 30 from a number of sources, including but not limited to, user entry devices, such as terminal 90, sensors measuring physical quantities, the internet, HTTP requests, IP (or similar) addresses and an intranet. The data entry device 15 passes the data records 30 to the data analysis system 20. It will be seen that the data records 30 comprise a plurality of data input items, which are collectively labelled with the reference numeral 35. Each one of the data items 35 can be individually processed. Examples of the data items 35 include, but are not limited to, timestamps and values of data.

In one aspect of the invention it is possible to aggregate the values of the data over time and instead of storing multiple data records 30 only a single data record with an average value is stored, as will be explained later.

Figure 2:
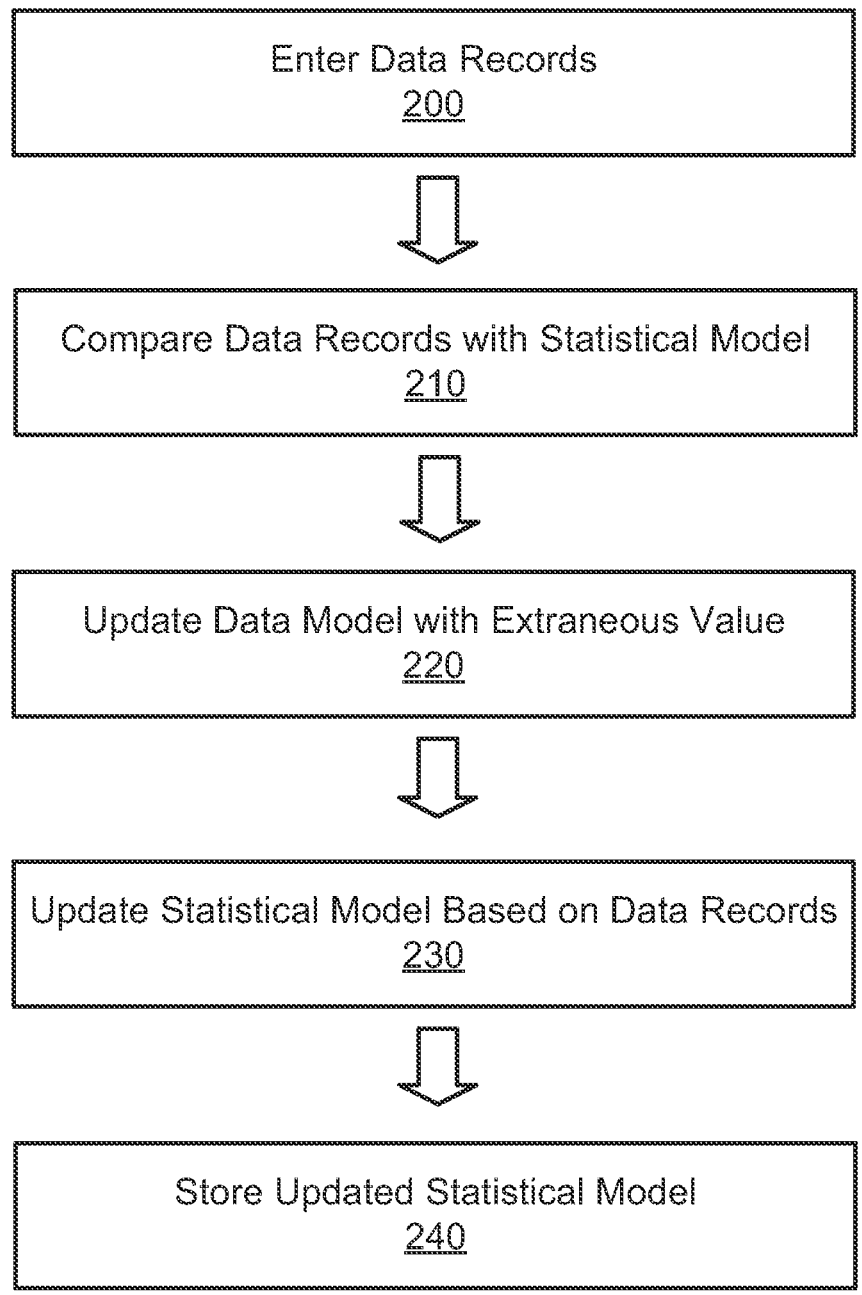
FIG. 2 shows the method for analysing data.

FIG. 2 shows an example of the method of this disclosure. The method uses a Bayesian framework in the data analysis system 20 to develop the statistical model 50 from the input of the data records 30. The data records 30 with the plurality of data items 35 are entered using the data entry device 15 from a plurality of sources in step 200. As noted above, it is possible to pre-process the data by creating an aggregate value over a period of time. The data analysis system 20 uses the newly input data items 35 to compare the newly input data items 35 with the statistical model 50 in the statistical model store in comparison step 210.

This comparison step 210 will highlight any insights in the newly input data items 35.

The statistical model initially starts off with an initial model that can be non-informative or can incorporate expert knowledge, such as CPU ranges from 0-100%. The aim of the method is to develop the statistical model 50 such that the statistical model 50 identifies relationships between different ones of the data items 35 and the comparison step 210 can identify insights, such as anomalies in the data items 35 because one or more values of the data items 35 are different than the expected values or the relationships between the data items 35 are different. It will be appreciated that initially the variance in values of the data items 35 may be large. Over a short period of time, it will be expected that the average range of values of each of the data items 35 is established and that the variance of the values decreases. For example, any daily variations in the values of the data items 35 should be identified within a few days, whereas monthly variations in the values of the data items 35 will take a few months. The relationships will be multi-dimensional and clustering of the data items 35 will be established, as shown in connection with FIG. 3.

Should the comparison step 210 identify an "abnormal" value, i.e. a value lying substantially outside the range of expected values of one or more of the data items 35, then this abnormal value can be highlighted in one of the messages to the user or the supervisor in step 220. The user or supervisor uses this highlighted value to investigate the reasons for the abnormal value using the terminal. The user or supervisor can gain an insight into the data in which the abnormal value was identified.

The statistical model 50 is updated in update step 230 using the newly inputted data items 35 from input step 210. The updated statistical model 50 can be stored in the data base 60 together with the data records 30 with the data items 35 in storage step 240. This updating of the stored statistical model 50 in update step 230 happens in real time or could be initiated in a batch process, for example overnight when the system 10 has available processing capacity.

As noted above, not all of the data items 35 needs to be stored in the data base 60 or processed by the data analysis system 20. Indeed it is possible that the data items 35 are not stored in the system 10 at all, but are accessible from the system 10.

A data aggregator 70 can be used to aggregate or bucket together several of the data items 35 from different ones of the data records 30. For example, all of the values of one of the data items 35 could be averaged over a period of time. The data aggregator 70 would then provide the average value of the one of the data items 35 for use in the comparison step 210 and the update step 220 as well as storage in the data base 60. This saves in processing time and storage space. Additionally, the data items 35 coming from the same one of the data entry devices 15 could also be stored together or averaged, depending on the requirements of the system 10.

The statistical model 50 is self-learning. It is not created using a set of 'training' data that has been labelled. The data analysis system 20 using the data items 35 to create a series of relationships between the various data items 35. The relationships could be temporal relationships, i.e. that one of the data items 35 takes particular values after a certain amount of time, could be averages or means with standard deviations or could be examples of variances in the data. The statistical model 50 is continually updated by the newly ingested data records 30. So, for example, as a configuration of the system 10 changes then new data items 35 are entered and the statistical model 50 does not remain static, but is able to adjust its calculation based on the newly ingested data records 30.

In one aspect of the invention, the statistical model 50 can be used to predict future values and forecast events. It is also possible to calculate the probability of a particular event happening and then make a comparison after the event has happened.

Example 1

The system and method of the disclosure can be used to determine changes in the occurrence of events and values of the data. Suppose that one of the incoming data records 30 has data items 35 which are measured at a time (t) and have a value (V) of the data for the occurrence of a particular event E. The data items 35 have a timestamp associated with them, which has the value t.

The values V of the data are used to develop and update the statistical model 50 in the store 40. In this example, the user is interested in the number of events E over time as well as the average V over time. The rate of change of the value of the data as well as the change in the number of events E is recorded in the statistical model having been calculated from previous values of the data records 30. The mean of the values of the data, the running total average of the values of the data and/or the standard deviation of the value are stored in the statistical model 50. The direct storage of these values in the data base 60 means that these values no longer need to be re-calculated if the supervisor 80 wishes to review the patterns of the data. The supervisor 80 can merely interrogate the data base 60 to obtain the values of interest. The raw values of the data, i.e. the values V and the timestamp can also be stored as part of the data record 30.

A baseline for normal behaviour is calculated, which is reflected in the statistical model 50. So, if the rate of change of the data, the mean of the data or the standard deviation is within the baseline calculated by the statistical model 50 then the data analysis system 20 will merely store these values in the data base 60. The data analysis system 20 can generate a new data model 55 or update an existing data model 55 in step 220 to reflect any abnormal behaviour and issue an message (such as an alert) if the data analysis system 20 detects that any one of the values deviates abnormally from the baseline. This can be indicated to the supervisor 80 at the terminal 90. This abnormal deviation is stored in the data model 55.

The supervisor 80 can use the data model 55 and directly access the data base 60 to see the stored data items 35 and review the previous updated statistical model and otherwise view or manipulate the data items 35.

Example 2

Figure 3:
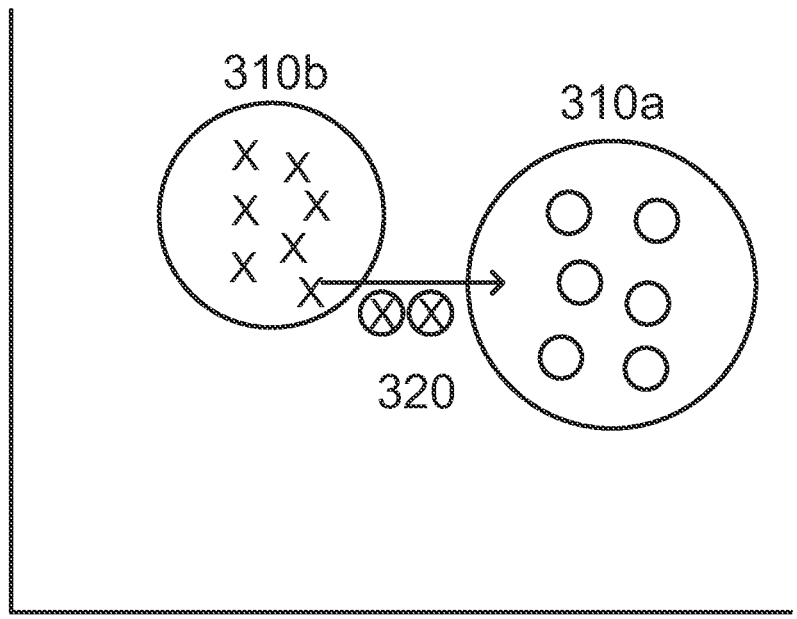
FIG. 3 shows clustering of data points.

A further use of the system and method of this disclosure is shown with respect to FIG. 3, which shows a series of clustered data points illustrated as data cluster 310a, and data cluster 310b. The clustered data points, data cluster 310a, and data cluster 310b are calculated in real time as the data records 30 are ingested into the data analysis system 20. The data cluster 310a, and data cluster 310b of which the data records 30 is a member is stored with the data records 30 in the data base 60. Suppose, however, that the calculation of the membership of the data cluster 310a, and data cluster 310b using the statistical model 50 indicates that there is a deviation from the expected membership. This will be notified to the supervisor 80, who is then able to investigate.

One particular example which may be of interest to the supervisor 80 is shown by the arrow 320 on FIG. 3, which shows that a series of data points representing the data records 30 is moving from membership of one data cluster 310b to another data cluster 310a. This movement will be documented and recorded in the data base 60 and can then be investigated by the supervisor 80 together with the associated data record 30. The supervisor 80 can query the data records 30 as well as the statistical model.

Example 3

A further use of the system and method would be in the use of financial trading. The statistical model 50 represents in this case the profile of financial traders and the transactions will be recorded in the data base 60 together with statistical model 50 representing the trades. One indication of whether a trader is carrying out the trades or whether this has been done by an automated bot is the rate of trades. The "normal" trading rate is a statistic that can be calculated by the data analysis system 20 and forms part of the statistical model. Should the trading rate increase rapidly, or come from a different IP address than expected, then these are abnormal values that are identified and recorded in the data model 55 to allow subsequent investigation.

Example 4

The system and method could be used by a retail store to monitor purchases, stocks, revenue etc. In this example, the data aggregator 70 will be used to at least reduce the amount of storage required in the data base 60. The system and method are used to forecast and/or predict sales. Factors, such as holiday periods or weather patterns can be further stored and the statistical model 50 used to establish relationships. For example, the relationship between summer weather and purchase of barbecue sets. Any abnormalities in the sales are stored in the data model 55 and can be analysed for insights into the sales.

The type of relationships that can be established is dependent on the data ingested by the system in step 220. This will depend on the available data as well as the administrator's interests. To take Example 4, a relationship between summer weather and the purchase of barbecue sets is only possible if data relating to the summer weather (temperature, rainfall, etc.) is ingested as well as details of the sale of the barbecue sets.

The system and method can also enable forecasting or prediction of trends.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS

10 System
15 Data entry device
20 Data analysis system
30 Data records
35 Data items
40 Store
50 Statistical model
55 Data model
60 Data base
65 Data base management system
70 Data aggregator
80 Supervisor
90 Terminal

What is claimed is:

1. A method for analysing data comprising:
generating an initial model;
receiving a plurality of data records comprising a plurality of data items of at least one particular event;
based on the initial model, determining in real time an expected value of at least one of the plurality of data items of the plurality of data records;
based on the initial model, determining in real time a value for a number of occurrences of the at least one particular event across the plurality of data records;
determining an average value of the at least one of the plurality of data items over a period of time, across the plurality of data records;
determining a change in the value for the number of occurrences of the at least one particular event over a period of time, across the plurality of data records;
comparing, using one or more processors, the average value of the at least one of the plurality of data items with the expected value from the initial model;
based on the comparing, identifying the average value of the at least one of the plurality of data items as being an abnormal value, the abnormal value being indicative of potentially anomalous activity occurring on a computing network, the identifying of the abnormal value being based at least in part on a rate of change of the average value of the at least one of the plurality of data items;
updating the initial model in real time in response to the identifying of the abnormal value or the change in the value for the number of occurrences of the at least one particular event to create a derived statistical model, the initial model being updated with the identified abnormal value or the change in the value for the number of occurrences of the at least one particular event;
determining clustering of the plurality of data items such that at least a first cluster and a second cluster are identified;
determining, based on the derived statistical model, that a series of data points which has moved from the first cluster to the second cluster has deviated based on the derived statistical model, the movement being indicative of abnormal anomalous activity; and
transmitting an alert message to a recipient based on the identifying of the abnormal value or the moving of the series of data points and indicating the potentially anomalous activity.

2. The method of claim 1, wherein the initial model includes a range of the at least one of the plurality of data items.

3. The method of claim 1, further comprising aggregating a number of the plurality of data items from different ones of the plurality of data records.

4. The method of claim 1, wherein at least one of the plurality of data records is representative of operation of a computer network, trading patterns of a trader, or purchasing patterns of consumers.

5. The method of claim 1, further comprising review of at least one of the derived statistical model to identify insights.

6. The method of claim 1, wherein the abnormal value is outside a range of expected values for the average value of the at least one of the plurality of data items.

7. The method of claim 1, further comprising developing the derived statistical model using a Bayesian framework.

8. The method of claim 1, further comprising developing the derived statistical model using a Bayesian framework, wherein the identifying of the abnormal value is based at least in part on the rate of change of the average value of the at least one of the plurality of data items.

9. The method of claim 1, wherein the expected value is at least one of a mean value, a cluster membership, or a standard deviation of the expected value.

10. The method of claim 1, further comprising wherein the expected value is which expected cluster the at least one of the plurality of data items is a member of, wherein the deriving of the statistical model includes determining a plurality of clusters, associated with the plurality of data records.

11. A system for analysing data comprising:
a data analysis system that generates an initial model; and
at least one data entry device that continually receives data records comprising a plurality of data items of at least one particular event, each of the data records being associated with a point in time, the plurality of data items being indicative of electronic trading requests;
the data analysis system further:
derives a statistical model based on a plurality of data records and the initial model,
after deriving the statistical model, accepts at least one of the plurality of data items,
based on the derived statistical model, determines in real time an expected value of the at least one of the plurality of data items,
determines in real time a value for a number of occurrences of the at least one particular event across a plurality of data records,
determines an average value of the at least one of the plurality of data items over a period of time, across the plurality of data records,
determines a change in the value for the number of occurrences of the at least one particular event over a period of time, across the plurality of data records,
compares the average value of the at least one of the plurality of data items with the expected value from the derived statistical model to determine abnormal values, the determining of the abnormal values being based at least in part on a rate of change of the average value of the at least one of the plurality of data items,
and
updates the derived statistical model in real time using the average value of the at least the one of the plurality of data items, the change in the value for the number of occurrences of the at least one particular event, or the abnormal values,
wherein the data analysis system:
detects the abnormal values when the average value of the at least one of the plurality of data items is indicative of abnormal anomalous activity performed by a computing bot executing the electronic trading requests;
determines, based on the derived statistical model, that a series of data points has moved from a first cluster to a second cluster, the movement being indicative of abnormal anomalous activity; and
transmits an alert message to a recipient based on the determination of the abnormal anomalous activity relative to the abnormal values or the moving of the series of data points.

12. The system of claim 11, further comprising a data aggregator for aggregating at least some of the plurality of data items and storing an aggregated data item.

13. The system of claim 11, further comprising a terminal adapted to receive messages and access a database where the updated derived statistical model is stored.

14. The system of claim 11, wherein the abnormal anomalous activity is indicated as being outside a range of expected values for the at least one of the plurality of data items.

15. The system of claim 11, wherein the initial model includes a range of the at least one of the plurality of data items.

16. A non-transitory tangible computer readable storage medium having embodied thereon a program, the program being executable by a processor to perform a method for suppressing noise, the method comprising:
deriving a statistical model based on a plurality of data records of at least one particular event and an initial model;
after deriving the statistical model, receiving at least one additional data record comprising a plurality of data items;
based on the derived statistical model, determining in real time an expected value of at least one of the plurality of data items;
based on the derived statistical model, determining in real time a value for a number of occurrences of the at least one particular event across the plurality of data records;
determining an average value of the at least one of the plurality of data items over a period of time, across the plurality of data records;
determining a change in the value for the number of occurrences of the at least one particular event over a period of time, across the plurality of data records;
comparing, using one or more processors, the average value of the at least one of the plurality of data items with the expected value from the derived statistical model;
based on the comparing, identifying the average value of the at least one of the plurality of data items as an abnormal value, the abnormal value being indicative of potentially anomalous activity occurring on a computing network, the identifying of the abnormal value being based at least in part on a rate of change of the average value of the at least one of the plurality of data items;
updating the derived statistical model in real time in response to the identifying the abnormal value or the change in the value for the number of occurrences of the at least one particular event, the derived statistical model being updated with the identified abnormal value or the change in the value for the number of occurrences of the at least one particular event;
determining clustering of the plurality of data items such that at least a first cluster and a second cluster are identified;
determining, based on the derived statistical model, that a series of data points has moved from the first cluster to the second cluster, the movement being indicative of abnormal anomalous activity; and
transmitting an alert message to a recipient based on the identifying of the abnormal value or the moving of the series of data points and indicating the potentially anomalous activity.

17. The non-transitory tangible computer readable storage medium of claim 16, wherein the abnormal value is outside a range of expected values for the at least one of the plurality of data items.

18. The non-transitory tangible computer readable storage medium having embodied thereon a program of claim 16, wherein the initial model includes a range of the at least one of the plurality of data items.

19. A method for analysing data comprising:
generating an initial model, the initial model being indexed to allow rapid retrieval;
receiving a plurality of data records comprising a plurality of data items of at least one particular event, each data record having a timestamp;
based on the initial model, determining in real time an expected value of at least one of the plurality of data items of the plurality of data records;
based on the initial model, determining in real time a value for a number of occurrences of the at least one particular event across the plurality of data records;
pre-processing the plurality of data records comprising the plurality of data items, by determining an average value of the at least one of the plurality of data items over a period of time, across the plurality of data records;
storing the average value of the at least one of the plurality of data items in a database;
determining a change in the value for the number of occurrences of the at least one particular event over a period of time, across the plurality of data records;
comparing, using one or more processors, the average value of the at least one of the plurality of data items with the expected value from the initial model;
based on the comparing, identifying the average value of the at least one of the plurality of data items as being an abnormal value, the abnormal value being indicative of potentially anomalous activity occurring on a computing network, the identifying of the abnormal value being based at least in part on a rate of change of the average value of the at least one of the plurality of data items;
updating the initial model in real time in response to the identifying of the abnormal value or the change in the value for the number of occurrences of the at least one particular event to create a derived statistical model, the initial model being updated with the identified abnormal value or the change in the value for the number of occurrences of the at least one particular event;
determining clustering of the plurality of data items such that at least a first cluster and a second cluster are identified;
determining, based on the derived statistical model, that movement of a series of data points from membership of the first cluster to membership of the second cluster has deviated based on the derived statistical model, the movement being indicative of abnormal anomalous activity; and
transmitting an alert message to a recipient based on the identifying of the abnormal value or the moving of the series of data points and indicating the potentially anomalous activity,
wherein the derived statistical model is self-learning, continually updated by additional data records and persisted for use as the additional data items are analysed, and wherein the initial model is persisted as a database of insights into the plurality of data records, the insights further comprising anomalies in the plurality of data items.

* * * * *